United States Patent [19]
Lee et al.

[11] Patent Number: 6,141,054
[45] Date of Patent: Oct. 31, 2000

[54] ELECTRONIC IMAGE RESOLUTION ENHANCEMENT BY FREQUENCY-DOMAIN EXTRAPOLATION

[75] Inventors: Chuen-Chien Lee, Fremont; Teruyosh Komuro, Santa Clara, both of Calif.

[73] Assignees: Sony Corporation, Tokyo, Japan; Sony Electronics Inc., Park Ridge, N.J.

[21] Appl. No.: 08/864,956

[22] Filed: May 29, 1997

Related U.S. Application Data

[63] Continuation of application No. 08/273,869, Jul. 12, 1994, Pat. No. 5,666,163.

[51] Int. Cl.$^7$ .............................. H04N 5/44; G06K 5/00
[52] U.S. Cl. .......................... 348/441; 398/581; 382/280
[58] Field of Search ................................... 348/441, 443, 348/448, 453, 458, 457, 240, 581, 382; 382/254, 260, 261, 263, 276, 280, 298

[56] References Cited

U.S. PATENT DOCUMENTS

| | | | |
|---|---|---|---|
| 5,136,377 | 8/1992 | Johnston et al. | 348/441 |
| 5,168,375 | 12/1992 | Reisch et al. | |
| 5,298,997 | 3/1994 | Manabe | 348/441 |
| 5,301,266 | 4/1994 | Kimura | |
| 5,337,153 | 8/1994 | Takayama | 348/441 |
| 5,379,072 | 1/1995 | Kondo | 348/441 |
| 5,384,869 | 1/1995 | Wilkinson et al. | |

FOREIGN PATENT DOCUMENTS

| | | |
|---|---|---|
| 447 039 | 9/1991 | European Pat. Off. |
| 2 211 691 | 7/1989 | United Kingdom |
| WO84/02019 | 5/1984 | WIPO |

OTHER PUBLICATIONS

Makoto et al., *Resolution Converting Method*, Patent Abstracts of Japan, JP5316357, vol. 18, No. 124, Nov. 11, 1993.

Osawa Michinao, *Printing Device*, Patent Abstracts of Japan, JP5261982, vol. 18, No. 25, Dec. 10, 1993.

Muramatsu et al., Scale Factor of Resolution Conversion Based on Orthogonal Transforms., IEICE Transactions of Fundamentals of Electronics, Communications and Computer Science, Jul. 1993, Japan, pp. 1150–1153.

TRW, Data Sheet for part No. TMC–2311, TRW LSI Products, Inc., P.O. Box 2472, LaJolla, CA 92038.

Agbinya, J., Interpolation Using the Discrete Cosine Transform., Electronics Letters, Sep. 24, 1992, U.K., vol. 28, No. 20, pp. 1927–1928.

Brouaye, F., Sampling and Wavelets: A New Approach to the Zero–Padding Method, Traitement du Signal, 1992, France, vol. 9, No 2, pp. 193–200.

Anil Jain, *Fundamental Image Transforms.*, pp. 128–130, 143–144, 150–154, Prentice–Hall, Englewood Cliffs, New Jersey, copyright 1989, ISDN.

*Primary Examiner*—Nathan Flynn
*Attorney, Agent, or Firm*—Wood, Herron & Evans, L.L.P.

[57] ABSTRACT

The resolution of an original image, represented as a pixel array, is increased by applying a spectral transformation to the pixel array, producing a spectral array representing the image, and then applying an inverting spectral transformation to produce a larger pixel array. The inverting spectral transformation is of a kind designed to convert high frequency spectral components not present in the original image or identified by the spectral array. These high-frequency terms of the inverting spectral transformation are either ignored or supplied with zero values. As a result, the final, larger pixel array has the same spectral distribution as the original pixel array, but a larger number of pixels.

16 Claims, 5 Drawing Sheets

ELECTRONIC IMAGE RESOLUTION ENHANCEMENT BY FREQUENCY-DOMAIN EXTRAPOLATION

RELATED APPLICATIONS

This is a continuation application of application Ser. No. 08/273,869 filed on Jul. 12, 1994, for ELECTRONIC IMAGE RESOLUTION ENHANCEMENT BY FREQUENCY-DOMAIN EXTRAPOLATION now U.S. Pat. No. 5,666,163.

REFERENCE TO MICROFICHE APPENDIX

This appendix is subject to copyright protection. The copyright owner has no objection to copying of the appendix in the form in which it appears in the files of the United States Patent Office, but reserves all other rights under copyright law.

FIELD OF THE INVENTION

The present invention relates to image enhancement to increase the number of pixels in a pixellated image.

BACKGROUND OF THE INVENTION

It is known to apply computers and other electronic computing circuitry to problems of image generation and enhancement. Image enhancement has been used in scientific applications, producing higher definition images providing improved insight, and also in consumer products such as enhanced definition television sets.

Typically, images are electronically stored in the form of pixels each having separate brightness and color characteristics. These pixels are displayed in an array to produce an image.

Often it is desirable to increase the number of pixels in an image, e.g. to display the image on a high resolution display or to zoom into a region of the image. A common technique for increasing the number of pixels in an image is known as interpolation. Under this technique, new pixels are inserted between existing pixels. The brightness and color characteristics of the new pixels are computed from the brightness and color characteristics of the original pixels which neighbor the new pixel, e.g. by averaging two or more nearest neighbors.

A difficulty with this technique is that it tends to reduce the sharpness of edges in the image. Edges of the image are characterized by large magnitude transitions in brightness or color between neighboring pixels. However, when a new pixel is inserted between neighboring pixels, the severity of the brightness or color transition is necessarily reduced.

Sophisticated interpolation techniques derive color and brightness values for new pixels using a weighted average of a large number of neighboring pixels, and can to some extent improve the sharpness of the resulting image. However, such sophisticated techniques can be computationally complex and therefore too slow for some applications, such as real-time video.

Thus there remains a need for a high quality image enhancement technique which does not significantly degrade the sharpness of the image and can also be computed in a reasonable time frame.

SUMMARY OF THE INVENTION

In accordance with the present invention, the spacial resolution of an original image, represented as a pixel array, is increased by applying a spectral transformation to the pixel array, producing a spectral array representing the spectral components of the image, and then applying an inverting spectral transformation to the spectral array to produce a larger pixel array. The resulting, larger pixel array has the same spectral distribution as the original pixel array, but spread over a larger number of pixels.

As noted above, conventional interpolation can be dissatisfactory because sharp edges are often obscured when new pixels are inserted between existing pixels. In contrast, the present invention produces a final pixel array having the same spectral distribution as the original pixel array, and therefore produces a final image having the same intensity of sharp edges as the original image.

To compensate for reductions in brightness caused by spreading spectral energy across a greater number of pixels, each entry of the original pixel array, the final pixel array, or the transformed spectral array may be increased in value by an amount related to the increase in resolution.

As noted above, elaborate interpolation techniques using large numbers of original pixels to compute each new pixel can improve sharp edges, but at a severe cost in computational complexity. While the present invention does involve a relatively complex computation, spectral computations are used in many different environments, and as a result, near-optimal computing techniques, and custom-designed computing circuitry, are available to increase the speed of computation. As a result, the present invention can achieve a similar level of image quality as elaborate interpolation techniques in significantly less computation time.

Principles of the present invention may be applied to video monitors, cameras, recorders or printers, for example to provide electronic zooming, or to modify a low-definition image to permit output on a higher definition device. In some video formats, images are represented as scan lines, in which case the scan lines are converted to form rows of pixels of a pixel array prior to conversion, and vice-versa after conversion.

Specific spectral transforms which can be used include the discrete cosine transform, the discrete sine transform, the fast Fourier transform, the Hadamard transform, the Harr transform, the Walsh transform, the Slant transform. Other transforms, and combinations of transforms, may also be used. The discrete cosine transform has the advantage that custom integrated circuits for performing this transform are commercially available and can be used to speed the transformation.

Large images may be parsed into several blocks, and the above methodology applied to the individual blocks. When the processed blocks are recombined, the resulting image quality can rival that achieved by processing the entire image at once. Some artifacts of the blocks may appear, but these can be reduced by selecting overlapping blocks from the original image; after processing the overlapping blocks are combined to form the final image by discarding overlapping pixels.

Principles of the present invention may be applied in one dimension, thereby increasing the number of pixels in the original image in one direction, or in two dimensions, thereby increasing the number of pixels in two directions. Specific applications include:

Using a two-dimensional transform to electronically zoom into a portion of an image.

Using a one-dimensional transform to display an image in a different resolution. One specific application is displaying an image on a monitor designed for a different aspect ratio, by selecting a central portion of the original aspect ratio image, and then increasing the number of pixels in the selected portion to allow display on the monitor in the new aspect ratio.

Producing a still image from a video frame containing two fields of interleaved scan lines, by selecting one of the fields of scan lines and using this field of scan lines with a one-dimensional transform to produce a greater number of scan lines.

Principles of the present invention may also be applied to applications requiring reduction in the number of pixels, in which case spectral information is discarded after transformation of the original pixel array and before inverse transformation.

The above and other applications and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
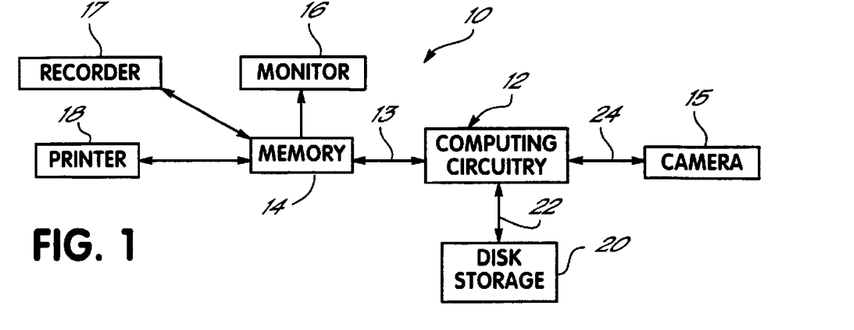
FIG. 1 is a functional block diagram of a system for increasing the resolution of an image by increasing the number of pixels in the image.

FIG. 1 illustrates a system 10 in accordance with principles of the present invention for enhancing the spacial resolution of electronic images. The system includes computing circuitry 12 which performs the enhancement of the image and stores the enhanced final image in a memory 14 for display on monitor 16, recording in recorder 17 or printing on printer 18. The image is retrieved by computing circuitry 12 from any suitable source, e.g. from disk storage 20 via line 22 or from a camera 15 via line 24.

The following figures and description detail procedures for enhancing images. The microfiche appendix being deposited in the Patent Office herewith details a computer program written for a general purpose microprocessor in standard C language which carries out the procedures described in the following figures and text on images stored in data files.

Although the attached appendix details a program for a general purpose computer, the image processing procedures described below can be carried out in various other ways, e.g. by software running on a microprocessor embedded in a special purpose device such as video camera 15, video monitor 16, video recorder 17 or video printer 18, or a stand-alone image processing unit which may be connected to any or all of these sources. Alternatively, some or all of the procedures described below can be performed by a special purpose computing circuitry, for example, custom integrated circuits, rather than general purpose computers using software. For clarity, in the following description, the general term "computing circuitry" will be used to collectively refer to any electronic configuration which can perform a computation, including by one or more microprocessors running software, by special purpose circuitry, or by a combination of both.

Furthermore, principles of the present invention may be used to process still or moving images from various different sources including, e.g., data files, television broadcasts, video tapes and cameras.

Figure 2:
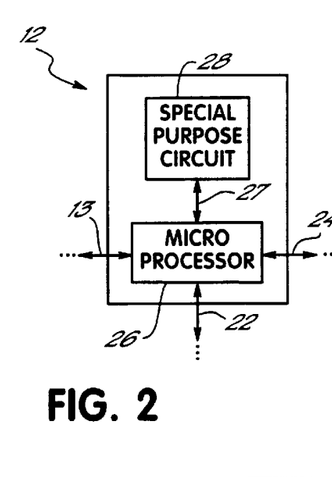
FIG. 2 is a functional block diagram of one embodiment of the computing circuitry 12 of FIG. 1.

Referring to FIG. 2, in one particular embodiment, computing circuitry 12 comprises a microprocessor 26 coupled to a special purpose circuit 28. Microprocessor 26 is programmed to retrieve images obtained on lines 22 and 24 and to display, print, or record images by transmission to memory 14 via line 13. Mathematical operations, described below, for processing the images are performed by special purpose circuit 28. Microprocessor 26 relays unprocessed image information to special purpose circuit 28 over line 27 and obtains processed image information from special purpose circuit 28 over line 27 and forwards the processed image information over line 13 to memory 14.

As noted below, in one embodiment of the present invention, image processing is performed through the use of the discrete cosine transform. In this embodiment, special purpose circuit 28 may be a commercially available fast cosine transform processor, such as the processor sold under part no. TMC-2311, by TRW LSI Products, Inc. of P.O. Box 2472, LaJolla, Calif. 92038. Other custom processors are available for performing discrete cosine transforms, or other suitable transforms.

Figure 3:
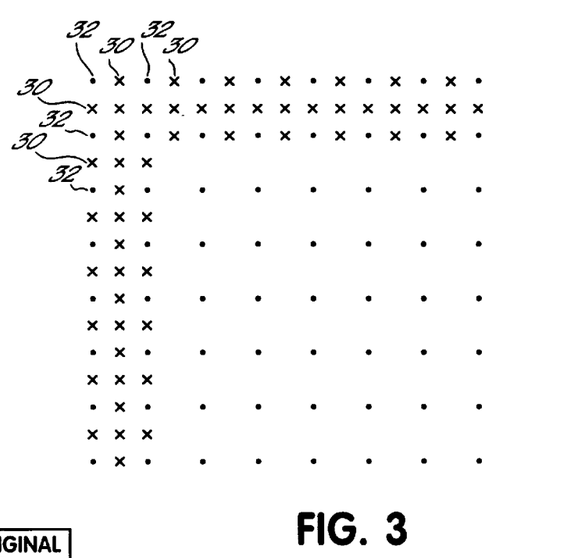
FIG. 3 is an illustration of a pixellated image including new pixels added by the system of FIG. 1.

Referring to FIG. 3, in accordance with the principles of the present invention, computing circuitry 12 increases the number of pixels in an image by generating new pixels 30 for insertion between existing pixels 32 in the image. The new pixels 30 may be inserted between vertical columns of existing pixels 32, between horizontal rows of existing pixels, or both, as is illustrated in FIG. 3. By inserting additional pixels between. horizontal rows of original pixels, the image resolution is enhanced in the vertical direction. By inserting additional pixels between columns of original pixels the resolution of the image is enhanced in the horizontal direction.

Figure 4:
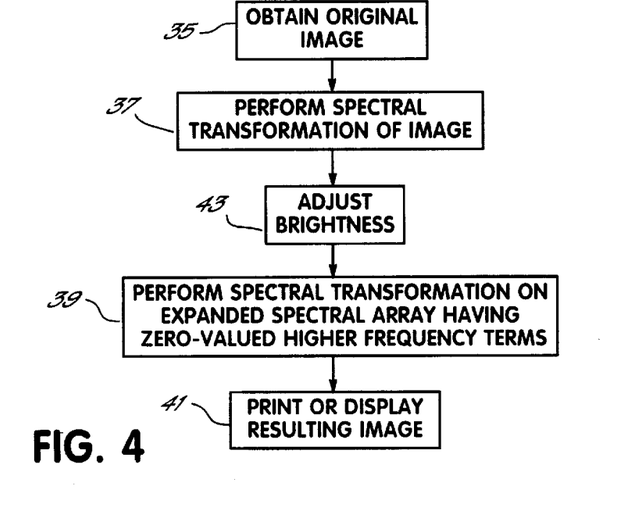
FIG. 4 is flow chart of the process used by the system of FIG. 1 to add pixels to an image.

Referring to FIG. 4, in general, in accordance with the principles of the present invention, pixels are inserted between existing pixels by a spectral transformation. After obtaining 35 an original image of pixels, the original image is spectrally transformed 37 to form a spectral array whose entries identify band limited spectral components in the spatial variation of the luminance or color values of pixels in the original image. This spectral array is then used (after brightness adjustment and other steps, noted below) as the basis for an inverse spectral transformation 39. To perform the inverse spectral transformation, the spectral array is expanded in size to include zero valued entries corresponding to high frequency spectral components not identified or present in the spectral array prior to expansion. The expanded spectral array is then inversely transformed to produce a resulting pixel array. Through the inverse transformation, a pixel array having a larger number of pixels than the original image is generated. This final array is then printed or displayed 41.

The procedure described above will generate a final array for printing or displaying which has a spectral distribution similar to that of original image prior to expansion. However, the final array will have a larger number of pixels and therefore, can be displayed at a higher resolution.

The procedure illustrated in FIG. 4 includes a step 43 during which the brightness of the image is adjusted. This step is necessary because the expansion of the spectral array reduces the overall brightness of the image by spreading the spectral energy over a larger number of pixels. To compensate for this reduction in brightness, at step 43, the entries of the spectral array are increased in value by a multiplier proportional to the square root of the increase in the number of pixels. By adjusting the brightness in this manner, the resulting image printed or displayed in step 41 will have the same overall brightness as the original image obtained in step 35.

Figure 5A:
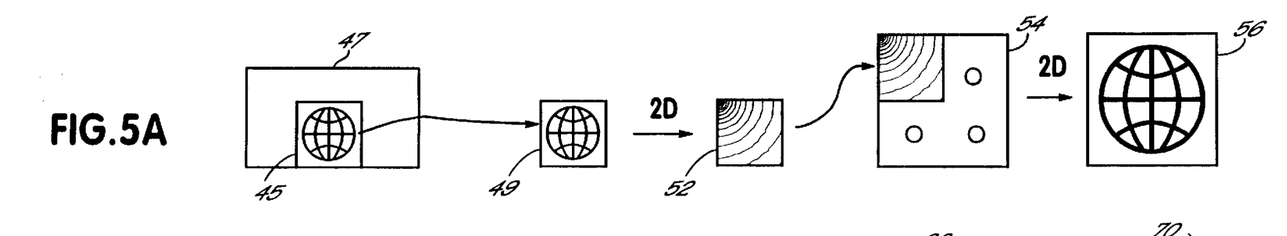
FIGS. 5A, 5B, and 5C are diagrammatic illustrations of arrays formed during the steps of the process of FIG. 4 for different types of images.
Figure 5B:
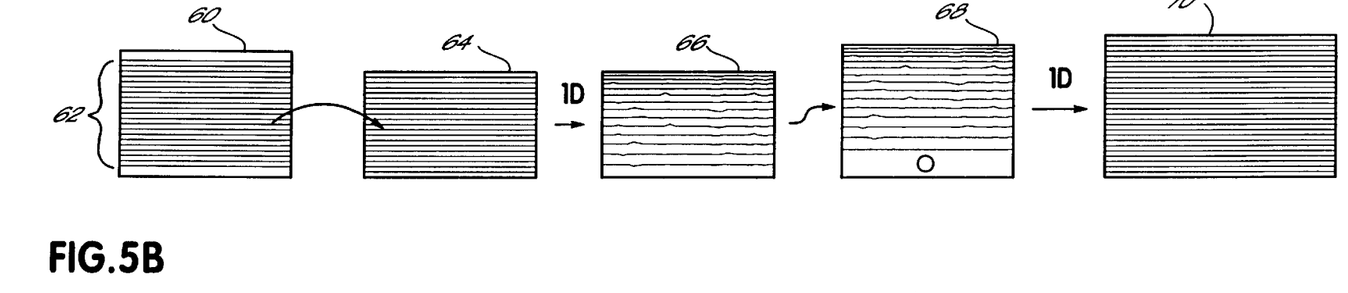
Figure 5C:
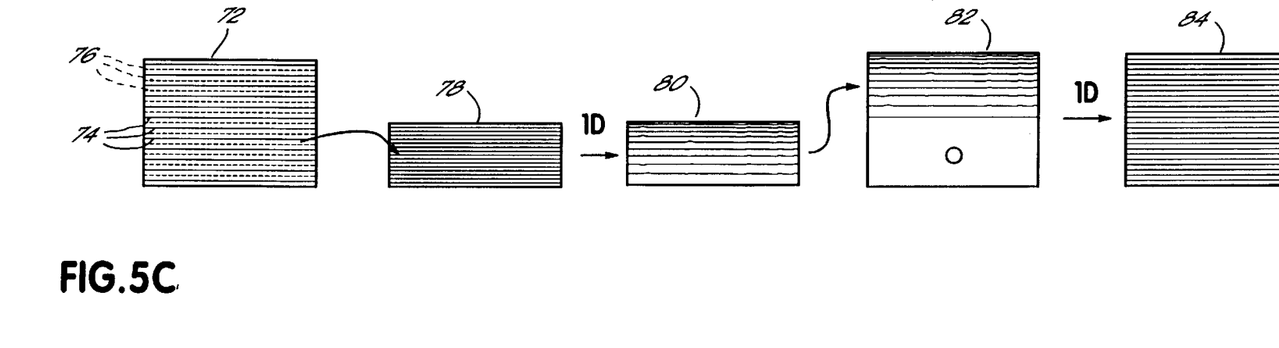

The general procedure described in FIG. 4 can be applied to various types of image processing as illustrated in FIGS. 5A through 5C.

Referring to FIG. 5A, one application of the general procedure of FIG. 4 is to perform an electronic zoom into a region 45 of a larger image 47. In this case, a region 45 to be zoomed is extracted from the larger image 47 and used as the original pixel array 49. This original pixel array is subjected to a two-dimensional spectral transformation to form a transformed spectral array 52. This transformed spectral array is then expanded to form an expanded spectral array 54 by inserting zero valued entries corresponding to higher frequency spectral components not identified by the transformed spectral array 52. Then, as a final step, the expanded spectral array 54 is subjected to a two-dimensional inverse spectral transformation, forming a final pixel array 56 which is an expanded version of the region 45 of the original image 47.

Referring to FIG. 5B, in another application, the procedure of FIG. 4 is used to change the aspect ratio of an image for display in a different aspect ratio. For example, an NTSC television frame, which has a 4:3 aspect ratio, may be converted to an HDTV frame, which has, for example, a 16:9 aspect ratio. As shown in FIG. 5B, a 4:3 frame 60 may be converted to a 16:9 frame by extracting a central group 62 of raster scan lines from the 4:3 image 60. The central raster scan lines 62 are used to produce a display on an HDTV monitor. HDTV monitors are designed for a greater number of scan lines and therefore, to display the central scan lines 62 on the HDTV monitor, it is necessary to fabricate additional scan lines.

To create these additional scan lines, the extracted raster scan lines 62 are used to produce an original pixel array 64 by converting each scan line into a row of pixels. Next, the original pixel array is subjected to a one-dimensional spectral transform in the vertical direction to produce a transformed spectral array 66. Then, this transformed spectral array is expanded to produce an expanded spectral array 68 by inserting zero valued entries corresponding to high frequency spectral components not identified by the transformed spectral array 66. Finally, the expanded spectral array is subjected to an inverse one-dimensional spectral transform to produce a final pixel array 70, and rows of pixels of the final pixel array 70 are used to generate HDTV scan lines.

In a third application, shown in FIG. 5C, the method described in FIG. 4 is used to generate a still image from a NTSC frame of scan lines. An NTSC frame of scan lines includes two fields of scan lines which are displayed interleaved with each other on an NTSC monitor. Thus, as shown in FIG. 5C a NTSC frame 72 includes a first field of scan lines 74, represented by solid lines in FIG. 5C, and a second field of scan lines 76, represented by dashed lines in FIG. 5C, which is interleaved with the first set of scan lines 74.

A difficulty with producing still images from NTSC frames is that the subject of the NTSC frame often moves between the recording of the first field of scan lines 74 and the second field of scan lines 76. As a result, the information contained in the first and second fields of scan lines does not properly align if the two fields are displayed simultaneously to produce a frame. (The misalignment is not visible to the eye when NTSC frames are displayed at normal speed such as during a television program; however, the misalignment becomes visible when a frame is displayed as a still image.)

To eliminate the misalignment, one approach is to produce the still image from only one of the two NTSC fields 74, 76 which form the frame 72. This approach produces an image having reduced clarity, but can be acceptable for certain applications. It is in this situation, where a single field is used to produce a still image from a frame, where procedure of FIG. 4 can be particularly useful. For example, it may be necessary to display the still image on a monitor which uses a large number of scan lines. In such a situation, it is necessary to fabricate additional scan lines from the field of scan lines taken from the original frame 72. To do this, the field 74 of scan lines from the NTSC frame is used to produce an original pixel array 78 by converting each scan line of the field into a row of pixels. Then this original pixel array is subjected to a one-dimensional spectral transform in the vertical direction producing a transformed spectral array 80. Then the transformed spectral array 80 is expanded to form an expanded spectral array 82 by inserting zero valued entries corresponding to high frequency spectral components not present in the original pixel array. Then the expanded spectral array 82 is subjected to an inverse one-dimensional transform to produce a final pixel array 84 from which scan lines can be recreated.

As seen by the above examples, the combination of a spectral transformation, expansion and inverse spectral transformation can be used to extrapolate additional pixels from an image in either one dimension or two dimensions by using respectively a one-dimensional or two-dimensional spectral transform. Any spectral transform can be used, for example, a fast Fourier transform, a discrete cosine transform, a discrete sine transform, a Hadamard transform, a Harr transform, a Walsh transform, a Slant transform, or a combination of two or more of the above, or any other transform which uses orthogonal eigenfunctions to produce an output related to spectral components of an input. Note, however, that some transforms (e.g., the Hadamard) have eigenfunctions comprised of long strings of binary coefficients (to reduce computational complexity); such transforms are best used with large images: if these transforms are used with images having smaller dimensions than the length of the eigenfunctions, the eigenfunctions will lose orthogonality and the transform will not properly separate spectral components.

In the software shown in the attached appendix, the discrete cosine transform is used to perform spectral transformations. The discrete cosine transform was chosen because there are several commercially available custom circuits which perform the discrete cosine transform, and thus in a commercial embodiment the discrete cosine transform would be relatively inexpensive to implement with custom circuitry. The software was used to prove the viability of the discrete cosine transform as the basis for such a commercial embodiment.

The transform is performed by the software found in the files named DCT.C (which performs a two-dimensional transform) and DCT21D.C (which performs a one-dimensional transform); the files are the same with the exception of a few lines commented out of DCT21D.C, as noted below. The transform procedure is named DCT_2D (see pages 3–4) in each file. To perform a one-dimensional transform, the software generates a coefficient matrix W using the procedure ComputeW or ComputeWI (see pages 1–2), and then, in essence, multiplies this matrix W by the input matrix using the procedure DCT (see page 3). The two-dimensional transform consists of two one-dimensional transforms computed in different directions across the input matrix. The lines performing the two one-dimensional transforms appear on page 4 of both files; however, in DCT21D.C the lines performing the first of the two one-dimensional transforms are commented out, so that DCT21D.C produces a one- rather than two-dimensional transform.

Further information about the discrete cosine transform and other transforms can be found in *Fundamental Image Transforms* by Anil Jain, published by Prentice-Hall, Englewood Cliffs, N.J., copyright 1989, ISDN 0-13-336165-9, incorporated by reference herein in its entirety.

As is generally illustrated in FIGS. 5A through 5C, the discrete cosine transform produces a spectral array in which low frequency spectral components (which typically contain the greatest spectral energy) are collected at a number of entries at one corner or end of the spectral array.

Thus, as shown in FIG. 5A, when a two-dimensional discrete cosine transform is applied to an original pixel array, the resulting spectral array has entries corresponding to low frequency components in the upper left hand corner and entries corresponding to succeedingly higher frequency components in locations succeedingly spaced away from the upper left hand corner. Thus, to expand a spectral array produced by the two-dimensional discrete cosine transform, zeros are added to the spectral array to the right, below, and to the lower right of the array, in positions which correspond to higher frequencies not identified in the spectral array. As a result, when an inverse discrete cosine transform is applied to the expanded array, the result is a final pixel array having the same spectral pattern as the original pixel array, but having a larger number of pixels.

Similarly, as shown in FIGS. 5B and 5C, when a one-dimensional discrete cosine transform is applied in the vertical direction to an original pixel array, the resulting spectral array has entries along its top row corresponding to low frequency spectral components in the original pixel array and entries in each succeeding row corresponding to succeedingly higher frequency spectral components. Thus, to form an expanded spectral array zero entries are added below the last row of the spectral array.

It will be appreciated that other types of transforms have other orientations of lower- and higher- frequency spectral entries, and will therefore need to be padded out differently than described above. Also, it will be appreciated that, as an alternative to forming an array padded with zero entries, the inverse transform calculations could be rewritten to disregard any terms involving high frequency spectral components not present in the original image or in the transformed spectral array. This modification would eliminate the step of expanding the spectral array to a larger array padded out with zero entries, and would reduce the number of calculations required.

Figure 6:
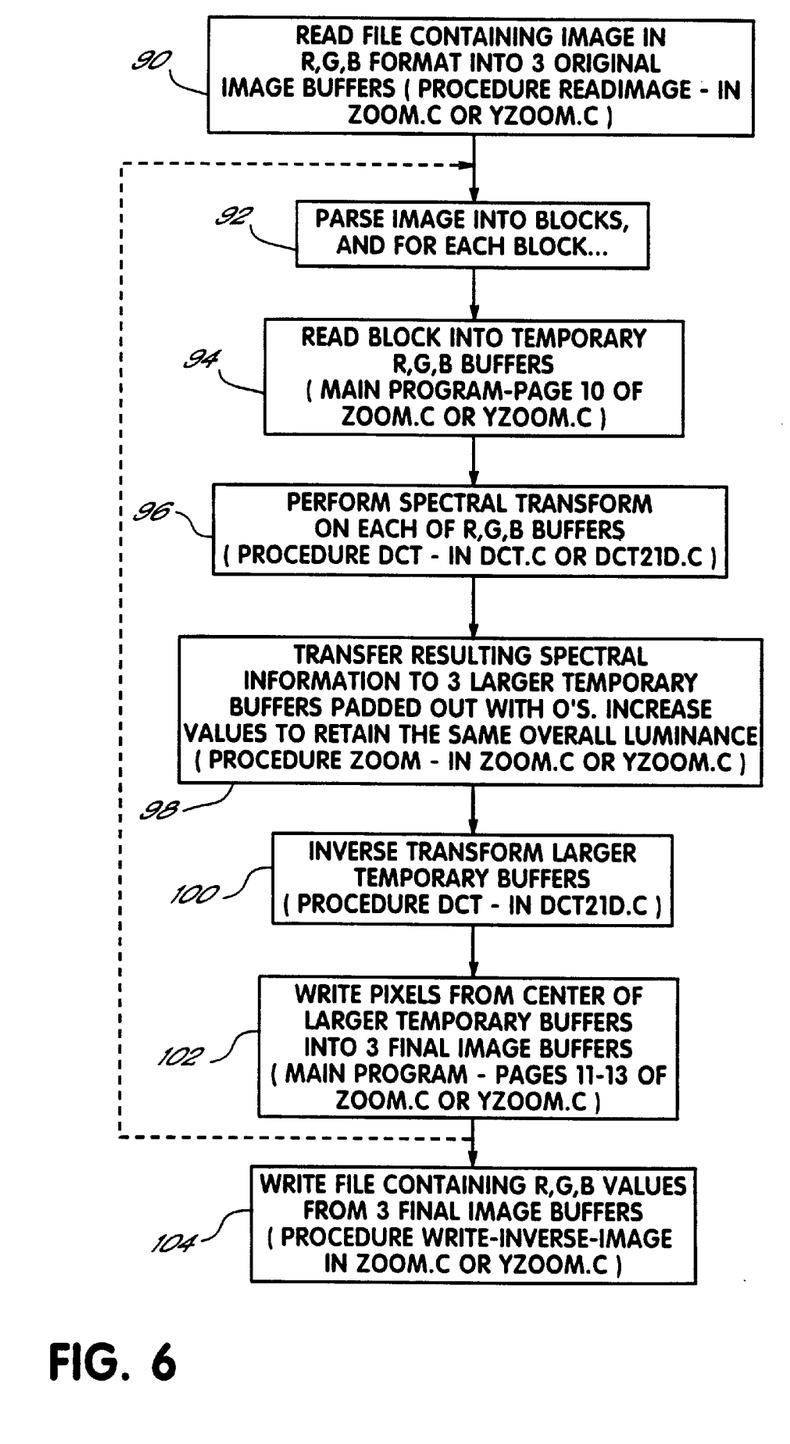
FIG. 6 is a flow chart of the software program contained in the attached appendix which is on implementation of the process of FIG. 4.

FIG. 6 illustrates a particular embodiment of the procedure of FIG. 4 implemented by the software in the attached appendix. This embodiment of the general procedure of FIG. 4 is particularly adapted for use with relatively large images. The large image is not processed as a whole, rather the image is processed as a sequence of smaller blocks.

The procedure of FIG. 6 starts by reading 90 an original file containing an image, for example, stored in a red, green, blue (RGB) format, into three buffers containing respectively red, green and blue intensity information for the image. Subsequently, the procedure of FIG. 6 parses 92 the image into smaller blocks, processing each block in accordance with the subsequent steps to produce a final image having a greater number of pixels.

Each block is processed by reading 94 the block into temporary buffers, one buffer for red, green and blue values, respectively. Then the procedure performs 96 the spectral transformation, e.g. a discrete cosine transform, on the pixels in each of the red, green and blue buffers. Next, the procedure transfers 98 the resulting spectral information in the red, green and blue buffers to three larger temporary buffers which have been padded with zero values in the manner generally shown in FIGS. 5A, 5B and 5C. At the same time, each of the non-zero spectral values is increased 98 by a factor proportional to the square root of the increase in the number of pixels to thereby maintain the brightness of the resulting image. The larger temporary buffers are then inversely transformed 100 and the resulting pixels are written 102 from the larger temporary buffers into three final image buffers.

The steps described in the previous paragraph are repeated for each block in the image until the three final image buffers contain a complete image processed to include a greater number of pixels. At this point, the procedure of FIG. 6 writes 104 the red, green and blue values from the final image buffers into a file. Alternatively, the resulting image could be printed or displayed on a monitor.

Each of the steps described in FIG. 6 is performed by the program included in the microfiche appendix attached to this application. Names of specific procedures in the microfiche appendix which carrying out the above steps are identified in parenthesis in FIG. 6.

Figure 7A:
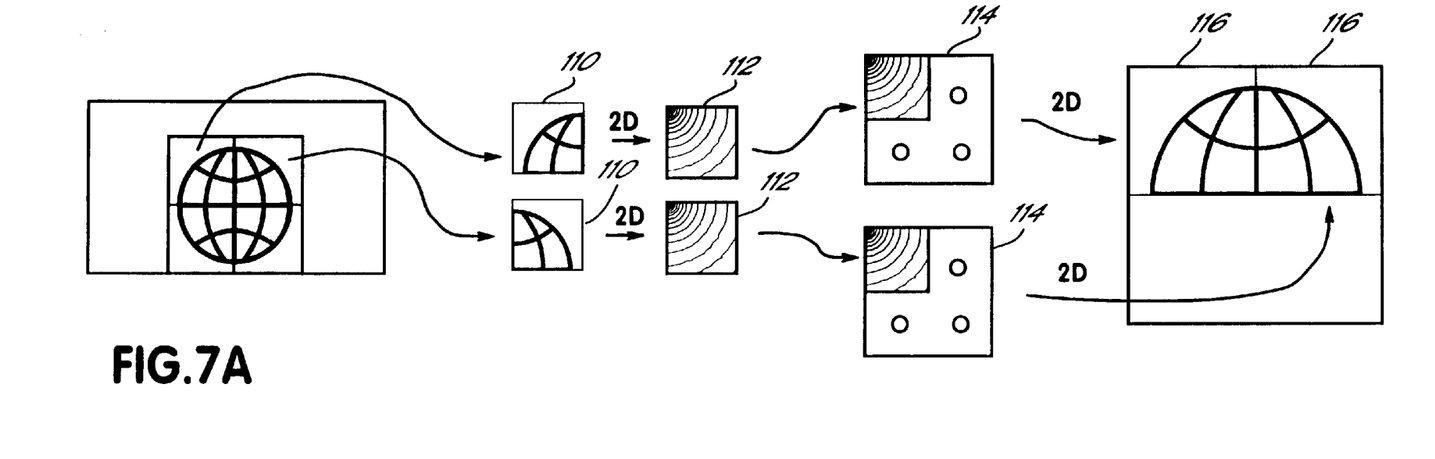
FIGS. 7A, 7B, 7C and 7D are diagrammatic illustrations of arrays formed during the steps of the software program of the attached appendix for different types of images.
Figure 7B:
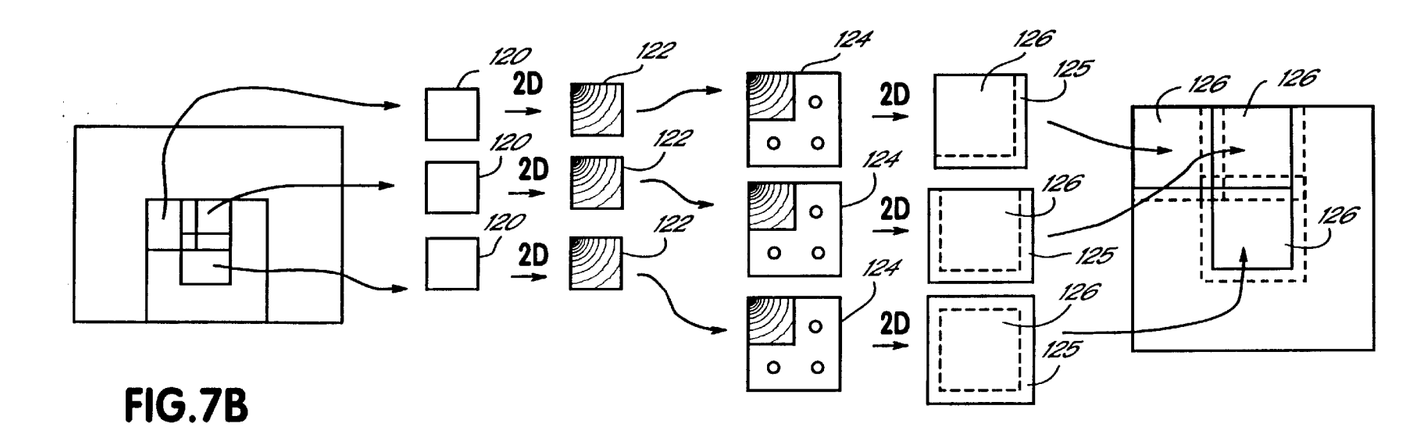
Figure 7C:
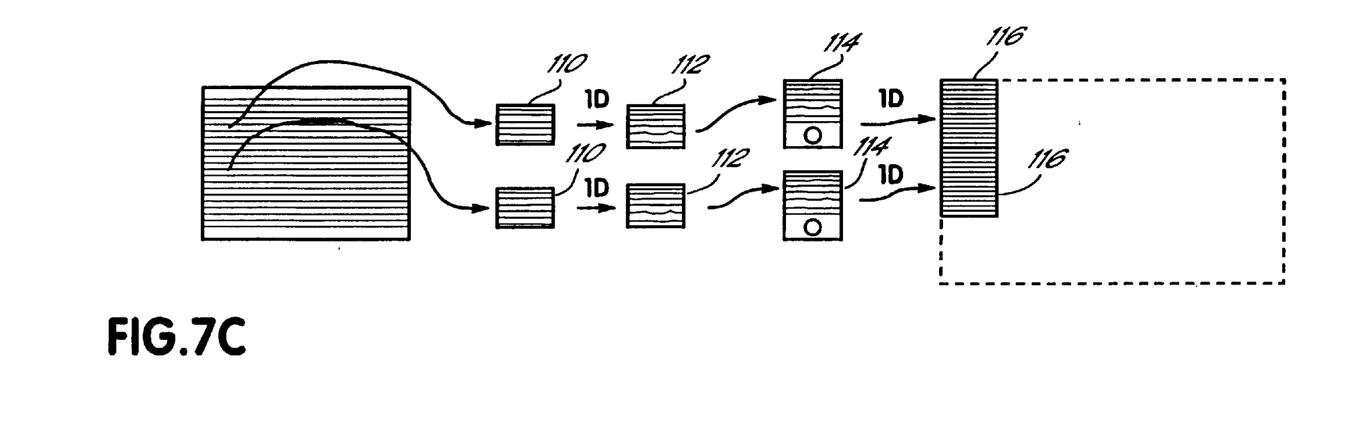
Figure 7D:
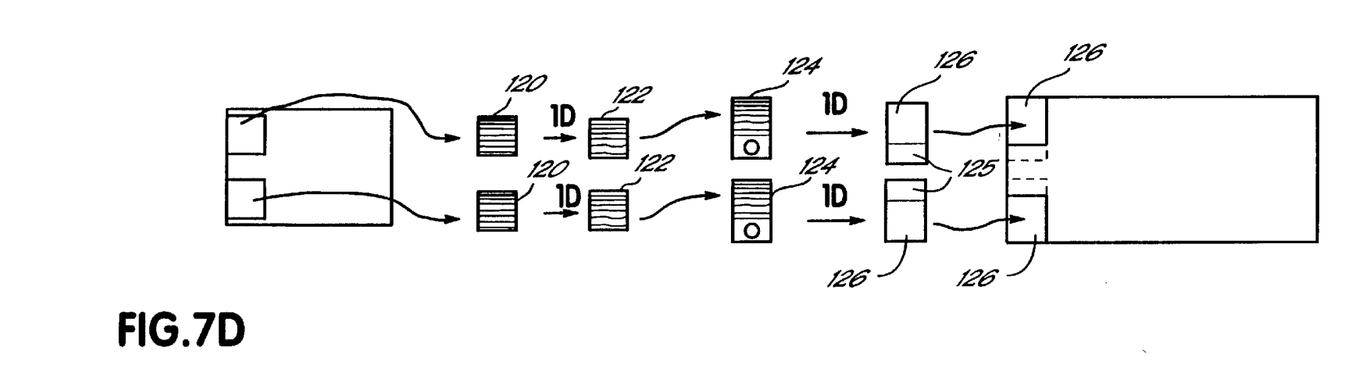

FIGS. 7A–7D illustrate two different methodologies for selecting blocks, overlapping and non-overlapping. FIGS. 7A and 7B show the procedure of FIG. 5A performed in a block-by-block fashion; in FIG. 7A, non-overlapping blocks are used, whereas in FIG. 7B, overlapping blocks are used. FIGS. 7C and 7D show the procedure of FIG. 5B performed in a block-by-block manner; in FIG. 7C non-overlapping blocks are used, whereas in FIG. 7D overlapping blocks are used.

Referring to FIGS. 7A and 7C, to perform a block-by-block transformation using non-overlapping blocks, the original image is parsed into non-overlapping blocks 110 which serve as original pixel arrays. Then, following steps 94 through 102 of FIG. 6, each of these non-overlapping blocks is subjected to a two-dimensional spectral transform (FIG. 7A) or a one-dimensional spectral transform (FIG. 7C) to form a spectral array 112. Subsequently, each spectral array 112 is expanded to form an expanded array 114 including zero entries. Finally, the expanded spectral array 114 is subjected to a two-dimensional inverse spectral transform (FIG. 7A) or a one-dimensional inverse spectral transform (FIG. 7C) to form a non-overlapping block 116 of the final image.

Thus, using non-overlapping blocks from the original image, non-overlapping blocks of the final image are produced and can be collected to build a complete final image.

Referring to FIGS. 7B and 7D, to perform a transformation of an image using overlapping blocks, first overlapping blocks 120 are selected from the original image. The blocks should be selected so that up to one-half of each block overlaps neighboring blocks. The overlapping blocks 120 are then processed following steps 94 through 102 of FIG. 6. Thus, blocks 120 are subjected to a two-dimensional spectral transform (FIG. 7B) or a one-dimensional spectral transform (FIG. 7D) to form spectral arrays 122. Next, these spectral arrays are expanded to form expanded spectral arrays 124. Finally, the expanded spectral arrays 124 are subjected to an inverse two-dimensional spectral transform (FIG. 7B) or an inverse one-dimensional spectral transform (FIG. 7D) to form blocks which may be assembled to create the final image.

The final blocks will partially overlap, so portions of the final blocks must be discarded when assembling them to produce the final image. To do this, the size of each final overlapping block is reduced by discarding peripheral pixels 125 to form a central portion 126 (indicated by dotted lines) having the same size as the zoomed non-overlapping blocks 116 illustrated in FIGS. 7A and 7C. The central portions 126 of the overlapping blocks are then assembled to produce the final image.

Some ringing and other artifacts may be created when the processing is performed in blocks rather than on the image as a whole. However, these effects are most notable at the periphery of the blocks, and therefore can be substantially reduced by applying the overlapped block methodology described above, which eliminates the periphery of each individual block before assembling the block into the final image.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, a three dimensional spectral transformation may be used to generate additional pixels in three dimensions. Higher-dimensional transforms may also be used. Furthermore, principles of the present invention may be applied to fields other than image processing. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for reducing the spacial resolution of an image comprising an original pixel array, each pixel characterized by luminance or color values, by transforming said original pixel array to a final pixel array having fewer pixels, comprising:

transforming said original pixel array into a transformed spectral array, each entry of said transformed spectral array identifying spectral components in spacial variation of luminance or color values of pixels of said original pixel array, inverse transforming said transformed spectral array to generate said final pixel array having fewer pixels, the luminance or color values of pixels of said final pixel array having a distribution of spectral components of spacial variation similar to low order spectral components of said original pixel array, but not including high order spectral components present in said original pixel array, and multiplying each entry in one of said original pixel array, said final pixel array, or said transformed spectral array, by a factor equal to the square root of the ratio of the number of pixels in said final pixel array to the number of pixels in said original pixel array, to compensate for increases in image brightness resulting from the reduced number of pixels in said final pixel array.

2. The method of claim 1 wherein inverse transforming said transformed spectral array comprises forming a contracted version of said transformed spectral array by discarding high order spectral components from said transformed spectral array, and applying, to said contracted version, an inverting transformational formula not including terms responsive to discarded high order spectral components.

3. The method of claim 1 adapted for use on a large original image, comprising selecting original sub-images each containing a subset of a smaller number of pixels of said large original image, applying the steps of claim 1 to each sub-image to generate final sub-images, and combining final sub-images to produce a large final image.

4. The method of claim 3 wherein selecting original sub-images includes selecting at least two original sub-images which contain overlapping pixels of said large original image, and combining final sub-images includes discarding overlapping pixels.

5. The method of claim 1 adapted to transform an original aspect ratio image to a different aspect ratio, further comprising selecting an original pixel array from a central portion of said original aspect ratio image, applying the steps of claim 1 to transform said original pixel array to a final pixel array having fewer pixels, and displaying said final pixel array in said different aspect ratio.

6. The method of claim 1 wherein said transforming and inverse transforming steps are performed in one dimension.

7. The method of claim 6 wherein said transforming and inverse transforming steps are performed in two dimensions.

8. The method of claim 1 wherein said transforming and inverse transforming steps are performed in accordance with one or a combination of two or more of the group consisting of:

a discrete cosine transform;

a discrete sine transform;

a fast Fourier transform;

a Hadamard transform;

a Harr transform;

a Walsh transform;

a Slant transform.

9. Apparatus for reducing the spacial resolution of an image comprising an original pixel array, each pixel characterized by luminance or color values, by transforming said original pixel array to a final pixel array having fewer pixels, comprising:

computing circuitry transforming said original pixel array into a transformed spectral array, each entry of said transformed spectral array identifying spectral components in spacial variation of luminance or color values of pixels of said original pixel array,     computing circuitry inverse transforming said transformed spectral array to generate said final pixel array having fewer pixels, the luminance or color values of pixels of said final pixel array having a distribution of spectral components of spacial variation similar to low order spectral components of said original pixel array, but not including high order spectral components present in said original pixel array, and     computing circuitry multiplying each entry in one of said original pixel array, said final pixel array, or said transformed spectral array, by a factor equal to the square root of the ratio of the number of pixels in said final pixel array to the number of pixels in said original pixel array, to compensate for increases in image brightness resulting from the reduced number of pixels in said final pixel array.

10. The apparatus of claim 9 wherein said computing circuitry inverse transforming said transformed spectral array comprises     circuitry forming a contracted version of said transformed spectral array by discarding high order spectral components from said transformed spectral array, and     circuitry applying, to said contracted version, an inverting transformational formula not including terms responsive to discarded high order spectral components.

11. The apparatus of claim 9 adapted for use on a large original image, comprising     computing circuitry selecting original sub-images each containing a subset of a smaller number of pixels of said large original image, and delivering each sub-image to the apparatus of claim 9, and     computing circuitry combining final sub-images to produce a large final image.

12. The apparatus of claim 11 wherein said computing circuitry selecting original sub-images selects at least two original sub-images which contain overlapping pixels of said large original image, and     said computing circuitry combining final sub-images discards overlapping pixels.

13. The apparatus of claim 9 adapted to transform an original aspect ratio image to a different aspect ratio, further comprising     computing circuitry selecting an original pixel array from a central portion of said original aspect ratio image, and delivering said original pixel array to the apparatus of claim 9, and     circuitry displaying said final pixel array in said different aspect ratio.

14. The apparatus of claim 9 wherein said transforming and inverse transforming are performed in one dimension.

15. The apparatus of claim 14 wherein said transforming and inverse transforming are performed in two dimensions.

16. The apparatus of claim 9 wherein said transforming and inverse transforming are performed in accordance with one or a combination of two or more of the group consisting of:

a discrete cosine transform;

a discrete sine transform;

a fast Fourier transform;

a Hadamard transform;

a Harr transform;

a Walsh transform;

a Slant transform.

\* \* \* \* \*